Oct. 19, 1937.  H. E. ALTGELT  2,095,949
HAY LOADER
Filed June 27, 1936   2 Sheets-Sheet 1
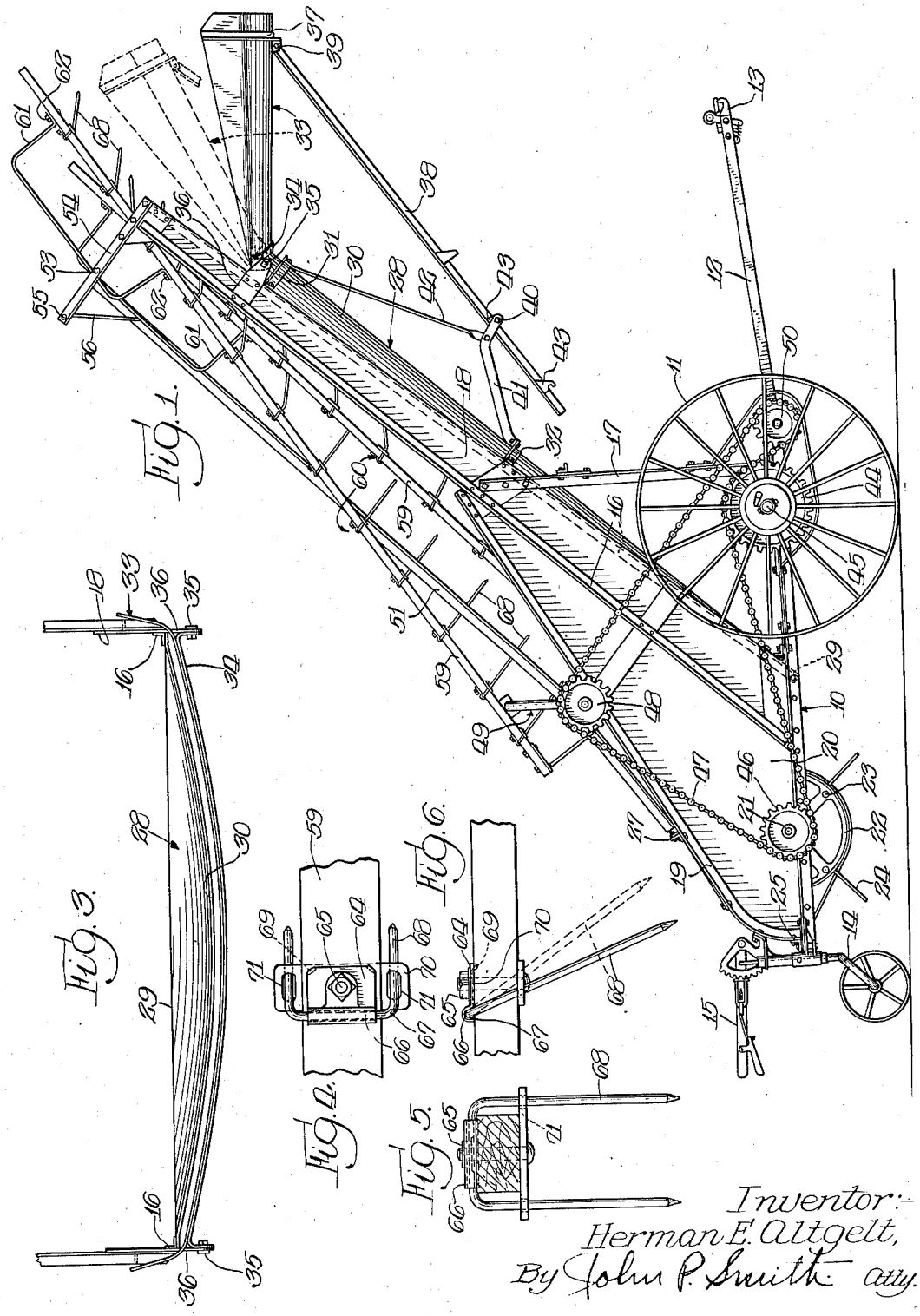
Inventor:-
Herman E. Altgelt,
By John P. Smith atty.

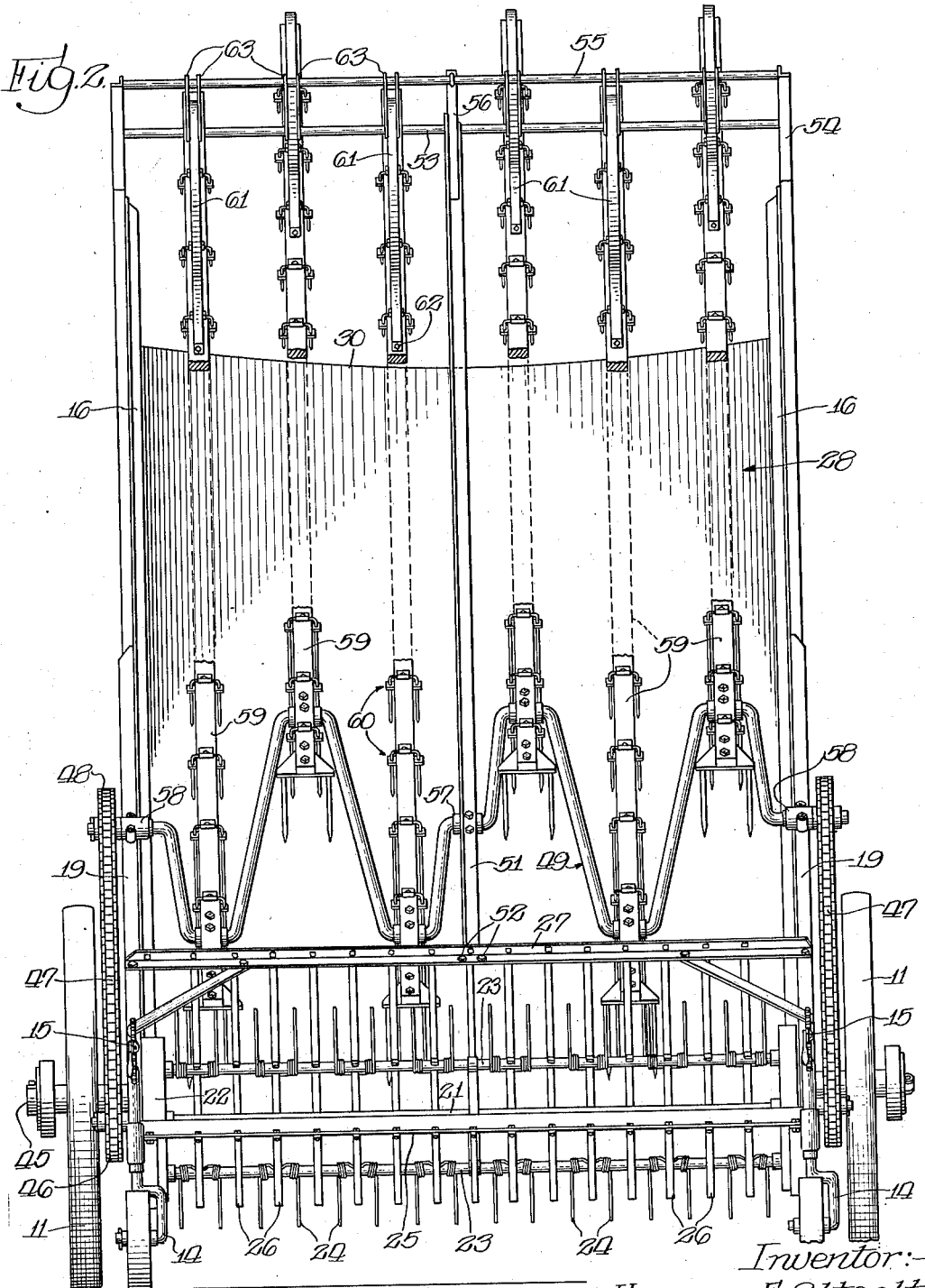

Patented Oct. 19, 1937

2,095,949

UNITED STATES PATENT OFFICE 2,095,949

HAY LOADER

Herman E. Altgelt, South Bend, Ind., assignor to Oliver Farm Equipment Company, a corporation of Delaware Application June 27, 1936, Serial No. 87,637

14 Claims. (Cl. 56—362)

The present invention relates generally to hay loaders of the cylinder rake bar type, but more particularly to novel and improved features thereof for simplifying the construction and increasing its efficiency and operation.

The primary object of the present invention is to provide a novel and improved construction of hay loader of minimum weight, of simplicity of construction and yet at the same time of sufficient durability and strength so as to render the same more efficient in operation.

Another object of the invention is to provide a novel and improved construction of hay loader in which the floor bed or deck thereof is straight at a point adjacent its lower end and gradually increases its curvature toward the upper end thereof so as to form in effect a longitudinally extending depression for directing the material being elevated to the longitudinal center thereof in proper position to be delivered in the center of the hay rack or wagon to which the loader is attached.

A further object of the invention is to provide a novel and improved hay loader having a curved or depressed deck whose curvature gradually increases toward the upper end thereof in combination with a similarly curved or depressed deck extension for directing the material being elevated to the longitudinal center of the hay rack or wagon being loaded. This arrangement is especially advantageous in connection with loading of hay on hillsides.

A still further object of the invention is to provide a novel and improved hay loader in which a gradually curved floor or deck permits the use of relatively lighter steel and at the same time reinforces and strengthens this part of the loader.

A still further object of the invention is to provide a novel and improved construction of hay loader in which a longitudinally extending brace located in the center of the elevator frame is arranged so as to support not only the rake bar hangers, but a center of third bearing for the rake bar crank shaft.

Another object of the invention is to provide a novel and improved hay loader construction in which a novel arrangement of attaching the movable tines to the rake bar is such that the clamping member for securing the tine to the wood covers and protects the wood around the bolt hole, against the elements of the weather.

These and other objects are accomplished by providing a construction and an arrangement of the various parts in the manner hereinafter described and particularly pointed out in the appended claims.

Referring to the drawings:

Fig. 1 is a side elevational view of a conventional type of cylinder rake bar hay loader having my improvements embodied therein;

Fig. 2 is a rear elevational view of the same;

Fig. 3 is a fragmentary end elevational view of the deck and deck extension showing the extension in a position extending substantially parallel with respect to the main deck of the loader;

Fig. 4 is an enlarged fragmentary top plan view of one of the rake bar tines;

Fig. 5 is an end elevational view of the same; and

Fig. 6 is a side elevational view of the same.

In illustrating one form of my invention I have shown the same in connection with a hay loader which comprises a main frame generally indicated by the reference character 10 which is supported at its forward end by means of wheels 11. Attached to the forward end of the frame 10 is the usual draft frame 12 which has its forward end provided with a spring latch 13 for attaching the same to the hay rack or wagon. The rear end of the frame 10 is carried by two spaced apart rear caster wheels 14 which are provided with manually adjustable means generally indicated by the reference character 15 for adjusting the rear end of the frame with respect to the ground in the manner well understood in the art. Mounted on the main frame 10 is an inclined elevator frame which includes side frame angle members 16 secured to the opposite sides of the main frame 10. The angle members 16 are braced in their angular position by vertically disposed supplemental main frame members 17. Extending between each of these angle members 16 and forming the opposite sides thereof are sheet iron sides 18. Extending from an intermediate portion of the side walls 18 and extending rearwardly at an angle are supplemental side frame angle members 19 which have their rearmost ends curved downwardly and attached to the sides of the main frame 10 in the manner clearly disclosed in Fig. 1 of the drawings. Extending between each of the supplemental side frame members 19 and the upper members 16 are sheet iron walls 20. Rotatably journaled in suitable bearings mounted on the main frame 10 is a shaft 21 to which is secured a raking cylinder drum 22. This drum comprises a plurality of spaced apart oscillatable shafts 23 which carry spaced apart spring fingers 24. These fingers are actuated to travel with the revolving cylinder so as to extend radially during a certain portion of the cycle of the operation of the cylinder and withdraw from the material being elevated at a certain other portion of the cycle of operation of the cylinder in a manner well understood in the art. Extending across the rear end of the longitudinal main frame member 10 is an angle 25. Attached to this angle member 25 at regular spaced intervals so as to extend between the spring fingers 24 are curved stripper bars 26. The forward ends of these stripper bars 26 are secured to a transverse angle member 27 which has its opposite ends secured to the opposite supplemental side frame members 19.

One of the essential features of the present invention includes a novel form of deck which is substantially flat at the bottom thereof and gradually curved towards the upper end thereof so as to form a longitudinally depressed floor for directing the material towards the axial center during its upward elevation. This novel deck forms a sheet metal bottom for the elevator frame and is generally indicated by the reference character 28. The lower end of this deck is perfectly flat or straight as clearly shown at 29 in Figs. 1 and 3 of the drawings and is attached to the opposite side walls 18 of the elevator frame. From this lower end the deck gradually curves as the upper end is approached and reaches a maximum curvature as shown at 30 so as to form in effect a longitudinally extending trough in the center thereof. The upper end of this curved deck 28 is reinforced by a curved brace member 31 which has its opposite ends secured to the lower angle members 16 located on the opposite sides of the deck. An intermediate portion of this deck 28 is also reinforced by a similar curved brace member 32 which has its opposite ends similarly secured to the lower frame members 16 located on the opposite side of the elevator deck.

Another essential feature in connection with my concave deck is an adjustable concave deck extension generally indicated by the reference character 33. Secured to the lower end of the extension 33 is a curved hinge member 34 which has its opposite ends bent substantially at right angles and are pivoted by means of bolts 35 to hinge brackets 36 secured to the opposite side frame members 16. The upper portion of the deck extension is reinforced by a curved angle member 37 secured to the underside of the extension adjacent the upper end thereof. The extension 33 is supported in various positions of adjustment with respect to the main deck of the loader by means of an adjustable bar 38 which has its upper end pivotally connected as shown at 39 to the lower side of the deck extension at a point adjacent its upper end while the lower end of the supporting bar 38 is adapted to be adjustably secured on a pin 40 extending between the forward ends of the two spaced apart bars 41. The bars 41 have their rearward ends attached to the curved brace 32 as clearly shown in Fig. 1 of the drawings. The bars 41 are supported in position by a strap 42 which has its upper end attached to the curved brace 31. Adjacent the lower end of the bar 38 and attached thereto in spaced apart relation are hook members which are adapted to engage the pin 40 for supporting the deck extension in various positions of adjustment.

From the above description it will be readily seen that by providing the elevator frame with a curved deck whose curvature or depression gradually increases towards the upper end thereof, the material being elevated will move toward the longitudinal center. It will also be noted that with the deck extension having a similar curvature, the material will be deposited or delivered at a point substantially in the longitudinal center of the hay rack or wagon where it can be conveniently distributed on the rack. This arrangement, of course, also satisfactorily overcomes the difficulty occasioned in loading hay on a hillside where the elevating of hay by a loader to a rack usually causes the discharge of hay to one side thereof and in some instances, fall short of discharging the hay onto the rack by discharging it on one side.

Operatively associated with each of the supporting and drive wheels 11 and in a manner well understood in the art, are separate sprocket wheels 44 which are mounted on the outer ends of the main axle 45, which in turn, are mounted in suitable bearings attached to the main frame 10. These sprocket wheels are geared to and operatively drive sprocket wheels 46 attached to the opposite ends of the shaft 21 for driving the cylinder 22 by chains 47. These chains 47 are trained about and operatively drove sprocket wheels 48 secured to the opposite ends of a crank shaft generally indicated by the reference character 49. Chain tighteners are provided for taking up the looseness of the chains 47 which include sprocket wheels 50 which in turn, are adjustably mounted on the main frame in any well known manner.

Another essential feature of the present invention includes a longitudinally extending brace bar which extends from a cross brace secured to the lower end of the elevator frame to the rake bar hanger or guide. This brace in addition to strengthening the rake bar guide also forms a support for a center bearing for the crank shaft. This brace includes a longitudinally extending angle member 51 which has its lower end secured by means of bolts 52 to the cross bar 27. The upper end of the brace member 51 is secured to the lower transverse guide rod or pipe 53 which in turn has its opposite ends secured to vertical angle members 54. The lower ends of these members 54 are attached to the outside side frame members 16 adjacent their upper ends. Spaced from the transverse guide rod 53 is a second guide bar 55 which in turn has its opposite ends secured to the upper ends of the side members 54. The upper end of the longitudinal brace 51 is reinforced and connected to the upper rod or pipe 55 by a bracket 56. Located adjacent the lower end of the longitudinal brace 51 is a center bearing 57 for the crank 49. The outer ends of the crank shaft 49 are journaled in bearings 58, which in turn, are secured to the supplemental side frame members 19 as clearly shown in Fig. 2 of the drawings. Journaled at regular intervals on sections of the crank 49 are conventional reciprocating rake bars 59. These rake bars are provided with a plurality of uniformly spaced apart rake tines or fingers generally indicated by the reference character 60 which contain certain novel features hereinafter more fully described. The upper ends of these rake bars have a floating action with respect to the deck within certain limits. Mounted on the upper ends of each of the rake bars 59 are loops or bales 61 which have their opposite ends attached as shown at 62 to the top sides of each of these rake bars. These loops 61 are guided in their reciprocatory and floating movement between guide straps 63 which have their opposite ends secured to the pipes or rods 53 and 55 respectively.

Another essential feature of the present invention includes a novel means of fastening the relatively moveable tines to the rake bars in which the tines are hinged to the upper surface of each of the rake bars with the bracket which forms the hinge also covering the hole extending through the rake bar and protecting the wood around the bolts from the elements of the weather. This novel arrangement comprises a hinge bracket 64 attached to the upper side of the rake bar 59 by means of a bolt 65. This bracket has a semi-circular curved portion on one end thereof as shown at 66 which partially embraces the bale portion 67 of the tine 68. The corners of the bracket 64 are bent downwardly as shown at 69 so as to penetrate the wood and prevent its displacement therefrom. Secured to the lower side of the rake bar 59 by means of the same bolt 65 is a tine guide 70 which has longitudinal slots 71 on the opposite ends thereof through which the free ends of the tine 68 project for limiting their oscillating motion within the confines of these slots as clearly shown in Fig. 6 of the drawings. Obviously this construction of putting the pivot bracket on the top surface of the bar permits the bracket proper to cover the wood rake bar adjacent the hole through which the bolt extends and protects it from the elements of the weather, reducing the deterioration and giving longer life to this part of the loader.

Summarizing the operation and advantages of my invention it will be readily seen that by providing a floor or deck of a loader with a gradually increasing curvature towards the upper end thereof as well as a curved deck extension, the material as it is conveyed upwardly will move towards the longitudinal center so as to deposit the material in the hay rack or wagon at a point substantially in the center thereof where it can be more conveniently distributed for piling the material on the rack or wagon. Then too, it will be observed that this curvature in the main deck and deck extension overcomes the difficulty heretofore experienced when loading hay or the like material on the side hill in that the material will be moved towards the longitudinal center of the hay loader and hay rack regardless of the tilt or angle at which both implements are travelling. It will also be noted that by providing a longitudinal center brace which extends from the cross bar of the frame adjacent the cylinder to the rake bar guiding frame for supporting the center bearing for the crank shaft which operates the rack bar, obviously a relatively lighter crank construction as well as the remaining structure may be employed and still retain the rigidity and strength required in such a device. It will also be noted that by arranging a pivot bracket for the movable tine on top of the rack bar a considerable protection is afforded to the wood rake bars adjacent the bolt holes from the elements of the weather and prevents them from deteriorating so that replacements are reduced to a minimum.

While in the above specification I have described one embodiment which my invention may assume in practice, it will, of course, be understood that the same is capable of modification and that modification may be employed without departing from the spirit and scope of the invention as expressed in the following claims.

What I claim is my invention and desire to secure by Letters Patent is:

1. A hay loader comprising a main frame, supporting wheels for said frame, an upwardly inclined elevator frame mounted on said main frame, and a deck forming the bottom of said elevator frame inclined towards the longitudinal center thereof.

2. A hay loader comprising a main frame, supporting wheel for said frame, an upwardly inclined elevator frame mounted on said main frame, and a deck forming the bottom of said elevator frame having a gradually increasing inclination toward the upper end thereof.

3. A hay loader comprising a main frame, supporting wheels for said frame, an upwardly inclined elevator frame mounted on said main frame, and a deck forming the bottom of said elevator frame having its lower end substantially flat and gradually increasing in its inclination toward the upper end thereof.

4. A hay loader comprising a main frame, supporting wheels for said frame, an upwardly inclined elevator frame mounted on said main frame, and a deck forming the bottom of said elevator frame being inclined downwardly toward the longitudinal center thereof.

5. A hay loader comprising a main frame, supporting wheels for said frame, an upwardly inclined elevator frame mounted on said main frame, and a deck forming the bottom of said elevator having its lower end substantially flat and gradually increasing in its inclination from the outer sides toward the longitudinal center thereof as the upper end is approached.

6. A hay loader comprising a main frame, supporting wheels for said frame, an upwardly inclined elevator frame mounted on said main frame, a deck mounted in the bottom of said elevator frame, said deck having a longitudinally extending depression in the center thereof, and a deck extension mounted on the upper end of said elevator frame forming an extension of said first named deck.

7. A hay loader comprising a main frame, supporting wheels for said frame, an upwardly inclined elevator frame mounted on said main frame, a deck mounted in the bottom of said elevator frame, said deck having a longitudinally extending depression in the center thereof, and a deck extension pivotally mounted on the upper end of said elevator frame and adjustable with respect thereto for forming an extension of said first named deck.

8. A hay loader comprising a main frame, supporting wheels for said frame, an upwardly inclined elevator frame mounted on said main frame, a deck mounted in the bottom of said elevator frame, said deck having a longitudinally extending depression in the center thereof, and an adjustable deck extension mounted on the upper end of said elevator frame and having a longitudinally extending depression in the center thereof forming the extension of said first named deck.

9. A hay loader comprising a main frame, wheels for supporting said main frame, an elevator frame mounted on said main frame, a bar extending across the lower end of said elevator frame, a hanger bar extending across the upper end of said elevator frame, reciprocating rake bars mounted above said elevator frame, an operating shaft having a plurality of cranks thereon for operating said rake bars, bearing means for the end portions of said shaft, bearing means for an intermediate portion of said shaft, and a supporting bar having its lower end secured to said first named cross bar and its upper end secured to said hanger bar, said supporting bar having an intermediate portion supporting said intermediate bearing means for said shaft.

10. A hay loader comprising a main frame, wheels for supporting said main frame, an elevator frame mounted on said main frame, a bar extending across the lower end of said elevator frame, spaced apart hanger bars extending across the upper end of said elevator frame, reciprocating rake bars mounted above said elevator frame, an operating shaft having a plurality of cranks thereon for operating said rake bars, bearing means for the end portions of said shaft, bearing means for an intermediate portion of said shaft, and a supporting bar having its lower end secured to said first named cross bar and its upper end secured to said hanger bars, said supporting bar having an intermediate portion supporting said intermediate bearing means for said shaft.

11. A loader comprising a main frame, wheels supporting said frame, an elevator frame mounted on said main frame including a transversely curved inclined deck and reciprocating rake bars, a crank shaft mounted on said rake bars, for operating said rake bars, bearings mounted on said elevator frame in which the outer ends of said crank shaft are journaled, a cross bar secured to the lower end of said elevator frame rearwardly of said crank shaft, guide bars mounted on the upper end of said elevator frame for guiding the free end of said rake bars, a longitudinally extending brace bar having its lower end secured to said cross bar and its upper end secured to said guide bars, and a center bearing for said crankshaft secured to an intermediate portion of said longitudinal brace bar for preventing vibration of said crank shaft.

12. In combination with a rake bar for a loader, a pivoted tine therefor comprising a substantially U-shaped member having its intermediate portion pivoted on the top surface of said rake bar, a hinge bracket secured to said bar and forming the pivotal support for said tine, a guide secured to the underside of said bar for limiting the pivotal movement of said tine, and means for securing said bracket and said guide to said bar.

13. In combination with a rake bar for a loader, a pivoted tine therefor having a prong portion and a bearing portion, a bearing bracket for said tine secured to the top side of said bar, and a bolt for securing said bracket to said bar, a portion of said bracket surrounding said bolt protecting said bar from the elements of the weather.

14. In combination with a rake bar for a hay loader, a pivoted tine having a prong portion and a bearing portion, a hinge bracket for pivotally securing said tine to the top side of said bar, a guide secured to the lower side of said bar and engageable with the prong portion of said tine for limiting the pivotal movement thereof, and a bolt extending through said bracket, guide and bar for securing the same in position.

HERMAN E. ALTGELT.